United States Patent
Christoph

(10) Patent No.: US 6,960,855 B2
(45) Date of Patent: Nov. 1, 2005

(54) BEARING FOR A MEASURING INSTRUMENT, PARTICULARLY A COORDINATE MEASURING INSTRUMENT

(75) Inventor: Ralf Christoph, Giessen (DE)

(73) Assignee: Werth Messtechnik GmbH, Giessen (DE)

(*) Notice: Subject to any disclaimer, the term of this patent is extended or adjusted under 35 U.S.C. 154(b) by 17 days.

(21) Appl. No.: 10/469,543

(22) PCT Filed: Apr. 26, 2002

(86) PCT No.: PCT/EP02/04674

§ 371 (c)(1),
(2), (4) Date: Oct. 26, 2003

(87) PCT Pub. No.: WO02/088624

PCT Pub. Date: Nov. 7, 2002

(65) Prior Publication Data

US 2004/0155543 A1 Aug. 12, 2004

(30) Foreign Application Priority Data

Apr. 26, 2001 (DE) .......................... 101 20 553

(51) Int. Cl.⁷ .................................................. H02K 7/09
(52) U.S. Cl. ............................................ 310/95; 310/12
(58) Field of Search ................................. 310/90.5, 12

(56) References Cited

U.S. PATENT DOCUMENTS

| 4,505,464 A | * | 3/1985 | Chitayat | 269/73 |
| 4,704,712 A | * | 11/1987 | Siryj | 720/676 |
| 4,812,725 A | * | 3/1989 | Chitayat | 318/625 |
| 4,834,353 A | | 5/1989 | Chitayat | |
| 4,985,651 A | | 1/1991 | Chitayat | |
| 5,648,690 A | * | 7/1997 | Hinds | 310/12 |
| 5,668,421 A | * | 9/1997 | Gladish | 310/12 |
| 5,701,041 A | * | 12/1997 | Akutsu et al. | 310/12 |
| 5,763,966 A | | 6/1998 | Hinds | |
| 6,150,740 A | * | 11/2000 | Slocum | 310/12 |
| 6,215,260 B1 | * | 4/2001 | Hinds | 318/135 |
| 6,343,415 B1 | * | 2/2002 | Okuda et al. | 29/740 |

FOREIGN PATENT DOCUMENTS

| DE | 2829715 | 2/1979 |
| DE | 28 29 715 | 2/1979 |
| DE | 34 41 426 | 8/1985 |
| DE | 44 08 912 | 12/1994 |
| JP | 2001-50271 | 2/2001 |
| JP | 2001-050271 | 2/2001 |
| WO | 91/13315 | 9/1991 |

* cited by examiner

Primary Examiner—Joseph Waks
(74) Attorney, Agent, or Firm—Dennison, Schultz, Dougherty & MacDonald

(57) ABSTRACT

A bearing (32) for a coordinate measuring instrument including a slide (36) which can be axially displaced in relation to a fixing device (34) and which can be supported opposite the fixing device by means of at least one air bearing (38, 40). In order to be able to utilize the bearing for all axes of the coordinate measuring instrument while simultaneously using outer surfaces of the slide as mounting surfaces for sensors, the invention provides that a force that works counter to the air bearing can be generated by a magnetic field (42, 44).

16 Claims, 3 Drawing Sheets

BEARING FOR A MEASURING INSTRUMENT, PARTICULARLY A COORDINATE MEASURING INSTRUMENT

The invention pertains to a bearing for a measurement apparatus, especially a coordinate-based measurement apparatus, that comprises a movable element, which preferably runs axially relative to, and especially along, a mounting device or guiding device, whereby this element is vertical, or runs at an angle α to the vertical, with α<90°, especially in the range α±45°, whereby this movable element, such as a carriage or column, has a measurement sensor, and is capable of being supported relative to the mounting device by at least one air bearing, whereby the air bearing's force, which is transferred to the element, is capable of being compensated by a counter force. In addition, the invention pertains to a bearing for a coordinate-based measurement apparatus that comprises a column or center sleeve, which is movable along the Z-axis of the coordinate-based measurement apparatus, with at least one measurement sensor that is supported, in a sliding manner, by at least one air bearing relative to a guiding device.

The use of air bearings has found extensive acceptance for achieving highly accurate moving carriages, especially in the area of coordinate-based measurement apparatus. Advantages, especially in regard to low reverse play or low friction, are achieved via bearings of the type in question, whereby these advantages are reflected in high measurement accuracy. However, a disadvantageous feature of bearings of the type in question is that they necessitate a considerable force for the initial tension.

Bearings are known in which the movable elements, such as carriages or traveling tables, are supported by oppositely facing arrangements of air bearings. A disadvantageous feature of oppositely facing air bearings is that wrapping around of the mechanical components takes place out of necessity. As a result, the installation of accessory units or accessory elements, such as sensors, is impaired. Servicing activities are also made difficult.

Alternatively, use can also be made of gravity for producing the initial tensioning force. In this case, however, limitations arise in regard to the spatial arrangement of the bearings so that, as a consequence, utilization for all the axes of a coordinate-based measurement apparatus cannot be considered.

A bearing for a coordinate-based measurement apparatus can be taken from DE 34 41 426 A1. In this case, the pedestal of a movable traveling table is supported by means of air bearings. Each bearing component of the air bearing has a projection, which is constructed in the form of an elastic element, in order to delineate a hollow zone that is capable of having compressed air admitted into it. A coordinate-based measurement apparatus is known from DE 44 08 912 A1 in which a vertically movable measurement carriage is supported in a bearing arrangement via compressed air cylinders. An air bearing for a measurement head of a coordinate-based measurement machine can also be taken from WO 91/13315.

DE 28 29 715 A1 pertains to a tool machine or measurement machine in which carriages, which are movable in the X- and Y-directions, are supported via air bearings, whereby the forces that are produced by the air bearings are compensated by counteracting forces that are produced by magnets. The column of the known measurement machine is supported, in a sliding manner, exclusively via air bearings.

According to U.S. Pat. No. 4,985,651, a tool table is supported via air bearings, whereby the forces from them are capable of being compensated by magnets. In this case, the table is capable of being moved in the X-direction or in the Y-direction.

According to JP 02 00 10 50 271 A, magnetic forces, which act on a carrier, are compensated via an air bearing.

The problem that forms the basis of the present invention is to further develop a bearing of the type that was designated at the beginning, especially one intended for a coordinate-based measurement apparatus, in such a way that it is preferably usable for all the axes, though especially for the Z-axis, of a coordinate-based measurement apparatus without the necessity arising that the element, which is to be supported by the bearing, is surrounded to such an extent by mechanical components that a hindrance arises for accessory elements, or that servicing activities are made difficult.

In accordance with the invention, the problem is essentially solved, on the one hand, by way of the feature that the counteracting force, which compensates the force that is produced by the air bearing as a result of the admission of gas thereto and whereby there is at least one such air bearing, is capable of being produced by at least one magnet that is allocated to the mounting device. In particular, the problem is solved in the case of the bearing for a coordinate-based measurement apparatus by way of the feature that the force, which is produced by the air bearing, is capable of being compensated by a counteracting force that is produced by a magnet that is allocated to the guiding device.

In this way, and in accordance with a proposal that is to be emphasized, the feature is provided that the element or column has an area on the outside that is not covered by the mounting device or the guiding device, whereby this area is above the element's or column's movement pathway or is approximately in the movement range thereof, whereby the measurement sensor and/or at least one additional measurement sensor and/or one or more components of the measurement apparatus or coordinate-based measurement apparatus originate at this non-covered area. In particular, the element or column has at least three outer surfaces, which run along the movement pathway, of which one outer surface is an attachment surface for the sensor or the component of the measurement apparatus, whereby there is at least one such sensor or component.

In accordance with the invention, the initial tension that is required for the air bearing, which supports the axially movable element, is compensated by a tensile force, which acts between the mounting device and the axially movable element, whereby this tensile force is produced by a magnet, whereby use is made in particular of a permanent magnet and a paramagnetic or ferromagnetic material, which is allocated thereto, as the magnet system. In this way, the component parts that form the bearing in question act on the same side of the axially movable element, so that the remaining area of the element is freely accessible and can thus be used for e.g. the installation of further component parts.

If the mounting device or guiding device for the carriage or column has L-shaped geometry, then the feature is provided in accordance with a further proposal that the mounting device or guiding device has U-shaped geometry, and that an air bearing originates at least along an inner surface of one of the shanks of the U-shape, and by the feature that the element or column has the geometry of a rectangle, whereby three outer surfaces run along the inner surfaces of the shanks, and by the feature that the remaining outer surface, which runs parallel to the transverse shank of the mounting device or guiding device, serves for attaching at least one measurement sensor and/or one or more components of the measurement apparatus or coordinate-based measurement apparatus. In this way, the feature is provided in particular that at least one magnet for producing the counteracting force is allocated to the transverse shank of the mounting device or guiding device. In particular, a magnet extends on each of the two sides of the air bearing that originates at the transverse shank.

As a result of the magnetically produced initial tension, the initial tensile force within the bearing is essentially independent of the incorporation position of the bearing itself, so that usage is possible for all the axes of a coordinate-based measurement apparatus.

In particular, the feature is provided that a permanent magnet originates at the axially movable element, whereby a paramagnetic or ferromagnetic material, which originates at the mounting device, is allocated to this permanent magnet or contains it.

In a preferred, further design, the feature is proposed that the axially movable element has a permanent magnet with a planar surface, whereby this permanent magnet is, in particular, strip-shaped or parallelepiped-shaped, and runs along the element and parallel to the direction of movement thereof, whereby the mounting device's material, which has the shape of a batten or parallelepiped, extends along this planar outer surface originating with an outer surface that runs parallel to that of the permanent magnet. Naturally, the permanent magnet can also originate at the mounting device, and the ferromagnetic or paramagnetic material can originate at the movable element.

In addition, the feature is provided that the movable element is a carriage, which has a square or rectangular cross sectional shape, and that an air bearing runs between each of two mutually adjacent first outer surfaces of the carriage and the area of the mounting device that faces toward it, and that the additional bearing element is arranged between the air bearings, whereby the additional bearing element extends, in particular, along an edge that runs between the first outer surfaces. In order to achieve this, this can be beveled in order to attach the strip-shaped or parallelepiped-shaped permanent magnet or the paramagnetic or ferromagnetic material, which has a corresponding geometry, in the case where the magnet originates at the mounting device.

If the magnet originates at the movable element, such as the carriage, then a batten, especially one comprising steel that originates at the mounting device, is allocated to the former in order to form the magnet system in order to produce the tensile force that is required in order to compensate, to the desired extent, the force due to pressure that is produced by the air bearings.

Additional details, advantages, and features of the invention arise not only from the claims and the features that can be taken therefrom—per se and/or in combination—but also from the following description of preferred examples of designs that can be taken from the drawings.

The following aspects are shown:

Figure 1:
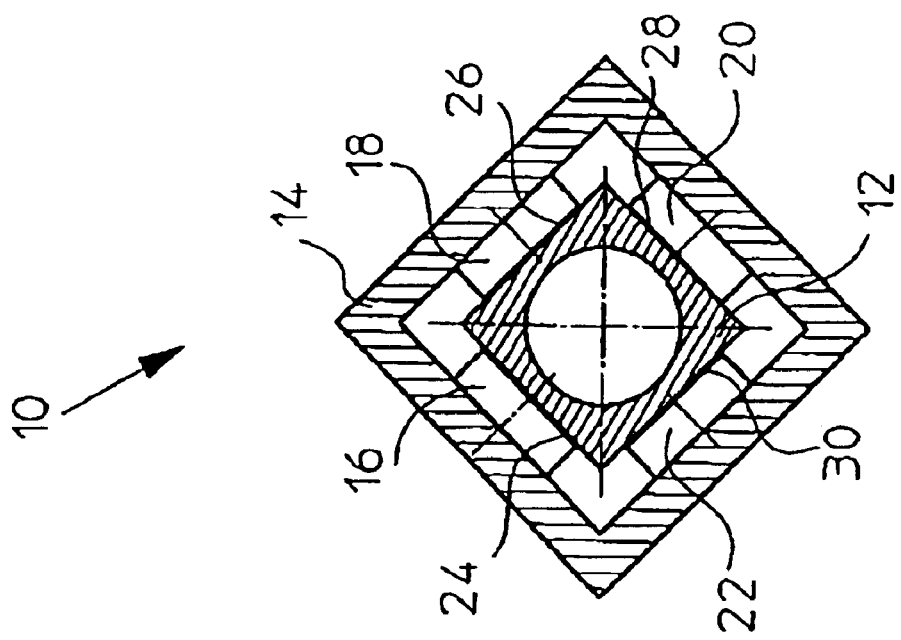
FIG. 1 shows a cross section of a bearing for a movable carriage in accordance with the prior art.

A basic illustration of a bearing 10 in cross sectional form in accordance with the prior art can be taken from FIG. 1, whereby this bearing is intended for the column 12 of a coordinate-based measurement apparatus. The column 12 is surrounded by a mounting device 14 and is supported relative to this by air bearings 16, 18, 20, 22.

The air bearings 16, 18, 20, 22 are of conventional construction above which an air gap 24, 26, 28, 30 is formed between the column 12 and the bearings 16, 18, 20, 22 in order to be able to move the carriage in a floating manner, via the mounting device 14, in the axial direction of the carriage 12.

As the basic illustration of FIG. 1 additionally makes clear, appropriate air bearings 16, 18, 20, 22 have to be arranged on opposite sides of the column 12 in order to the achieve the required initial tension since otherwise support would not be possible in a floating manner. This again means that the column 12 has to be surrounded—peripherally in this example of an embodiment—by the mounting device 14 with the consequence that components, such as the sensors of a coordinate-based measurement apparatus, are only capable of being attached to the column 12 to a limited extent. Difficulties at the time of servicing activities can also increase because of this mechanical wrapping around of the column 12.

In contradiction to the prior art, a bearing 32 is proposed in accordance with the invention that exhibits the advantages of an air bearing, though without taking on the disadvantages thereof. Thus the feature is provided that the forces due to pressure, which are provided by the air bearing, are compensated to the required extent by a magnet system, using the tensile forces that are produced by it, in order to permit the guidance, in a floating manner, of a movable element, especially a carriage, traveling table or center sleeve, of a coordinate-based measurement apparatus, whereby the direction of movement is preferably along the Z-axis, or at an angle $\alpha$ relative to the Z-axis with $\alpha<90°$, especially in the range $\alpha\pm45°$. The direction of the movable element, such as the column, can optionally be displaced, i.e. it is adjustable.

Figure 2:
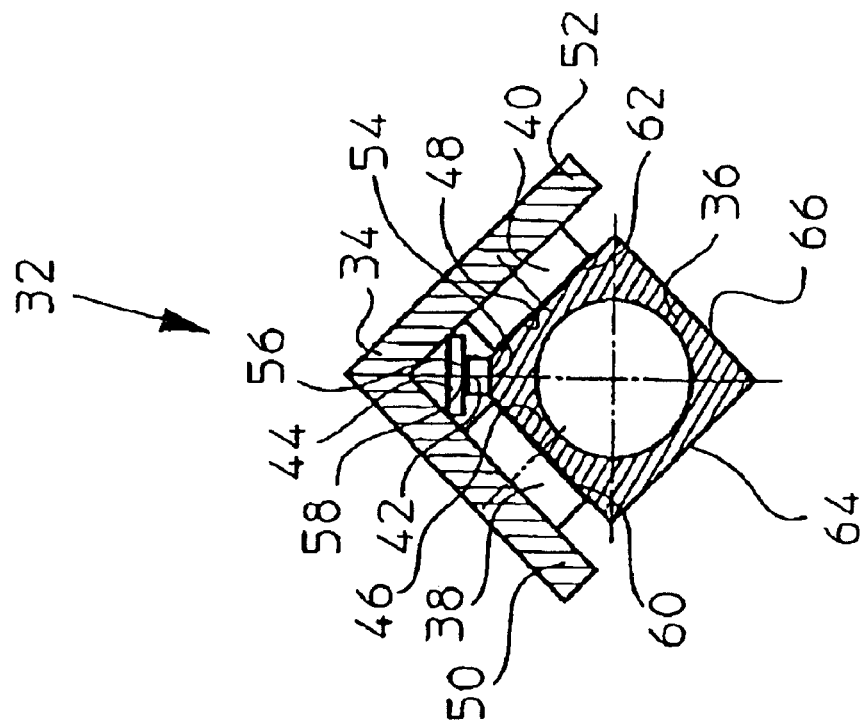
FIG. 2 shows a cross section of a first form of embodiment of a bearing in accordance with the invention.

The air bearing 32, which is illustrated in FIG. 2 in the form, likewise, of a purely basic structure, comprises, by way of example, a V-shaped or L-shaped mounting device 34 or guiding device along which an element 36, in the form of a traveling table, a carriage, or column or center sleeve, is required to be axially movable. In general, the element 36 will be termed a carriage. The carriage 36 is supported by two air bearings 38, 40 relative to the mounting device 34. In order to bring about the required initial tension, a magnet system, which comprises a permanent magnet 42 and a paramagnetic or ferromagnetic material 44 that is allocated to it, is provided between the carriage 36 and the mounting device 34.

The air bearings 38, 40 act on adjacent outer surfaces 46, 48 of the carriage 36 that has the cross sectional shape of a rectangle or parallelepiped. Accordingly, the mounting device 34, with shanks 50, 52, extends along the surfaces 46, 48 in order to form the air bearings 38, 40. The initial tension, which is required for the air bearings 38, 40 in order to admit air into them, is produced by the magnet system, which is formed from the permanent magnet 42 and the paramagnetic or ferromagnetic material 44, in the form of a batten.

In this way, the permanent magnet 42 in this example of an embodiment originates at a beveled edge 54, which runs between the mutually adjacent surfaces 46, 48, and has a planar outer surface 56 that runs parallel to a surface 58, which is aligned therewith, of the batten 44 that comprises e.g. steel.

Naturally, the permanent magnet and the batten 44 can also be interchanged.

As mentioned, the required initial tension for the air bearings 38, 40 is produced by the magnet system 42, 44, so that the required gap 60, 62 is formed in the area of the air bearings 38, 40 in order to be able to move the carriage 36 axially, and in a floating manner, along the mounting device 34.

Consequently, the remaining outer surfaces 64, 66 of the carriage 36 do not have air bearings, and are thus freely accessible on the basis of the teaching in accordance with the invention, and they can be used in an essentially unrestricted manner as installation surfaces for e.g. components, such as the sensors of a coordinate-based measurement apparatus.

As a result of the formation of the bearing 32, the possibility also arises of appropriately constructing an X-axis, a Y-axis and/or a Z-axis of a coordinate-based measurement apparatus.

Figure 3:
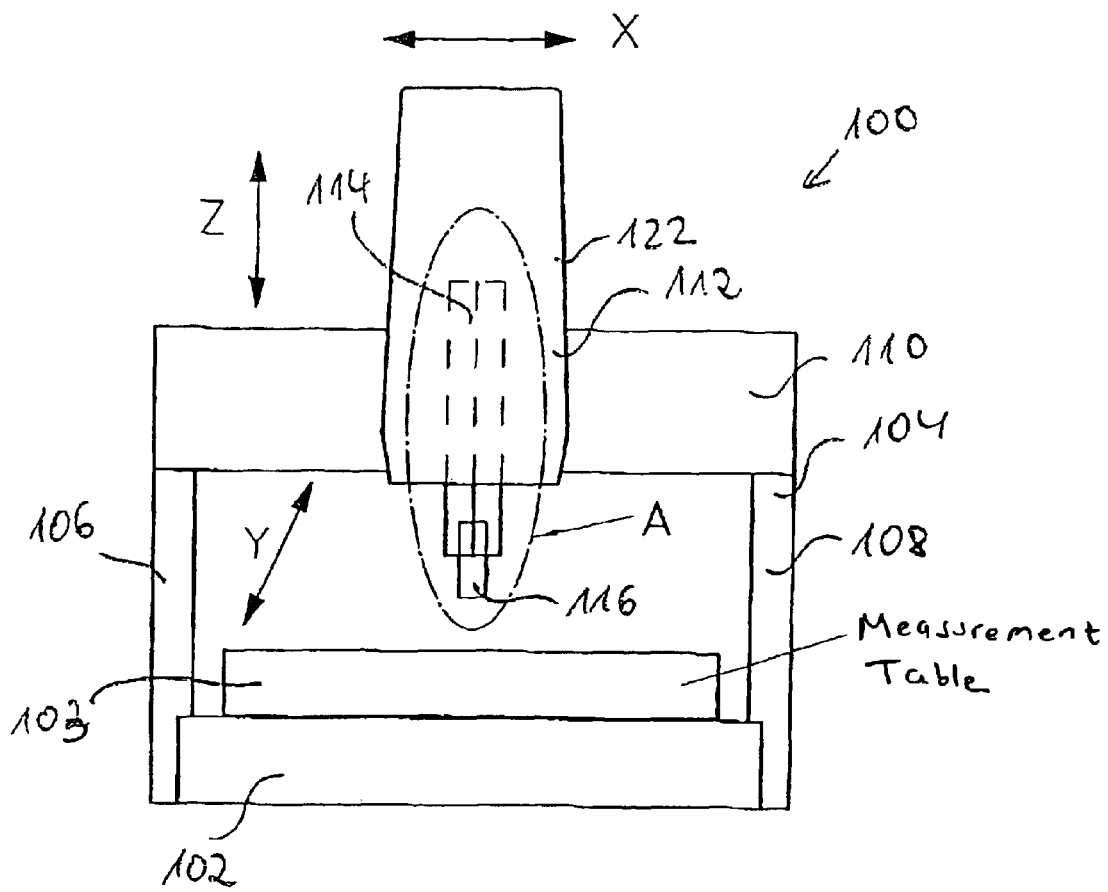
FIG. 3 shows a basic illustration of a coordinate-based measurement apparatus with the details thereof being illustrated.
Figure 3:
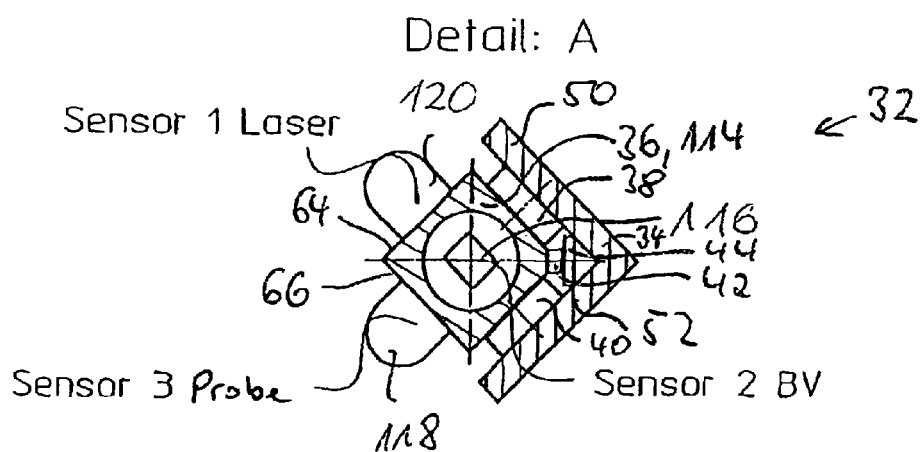

The teaching in accordance with the invention will explained, in particular, by means of FIG. 3. Thus a coordinate-based measurement apparatus 100 is illustrated in the form of a purely basic structure, whereby this coordinate-based measurement apparatus has a base frame 102 in a known manner on which a measurement table 108 has been arranged. A traveling table 104 is movable in the Y-direction along the base frame 102. In order to do this, columns or posts 104, 106 are supported, in a sliding manner, on the base frame 102. A cross arm 110 originates at the columns 106, 108, whereby a carriage 112 is movable along this cross arm, i.e. in the X-direction, whereby the carriage, for its part, accommodates a center sleeve or column 114 that is movable in the Z-direction. A measurement sensor 116, such as the optical system of an image processing sensor, originates at the center sleeve or column 114. The center sleeve, which as mentioned is also termed the column 114, is accommodated by a guiding device, which is constructed in accordance with the invention correspondingly to FIG. 2, so that identical reference symbols are used for identical elements.

Since two outer surfaces 64, 66 of the column 114 are freely accessible, measurement sensors, such as a laser distance sensor 120 or an opto-tactile or tactile probe 118, can originate at these.

A compact structure arises as a result of the fact that the outer surfaces 64, 66 of the center sleeve or column 114 are freely accessible, whereby the sensors 118, 120 are movable in the Z-direction even inside a covering arrangement or housing 122, i.e. they are protected.

Figure 4:
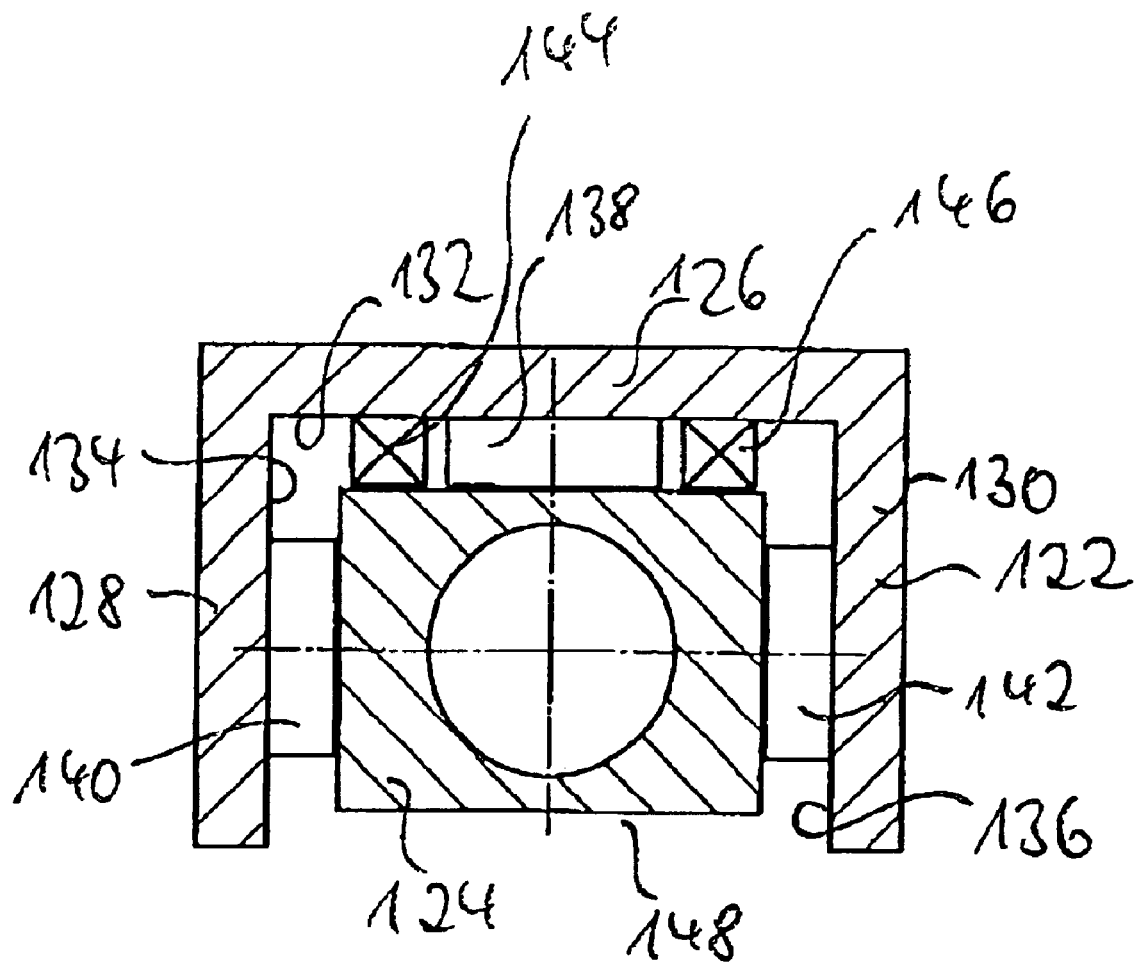
FIG. 4 shows a cross section of a second form of embodiment of a bearing in accordance with the invention.

A further form of design of a bearing in accordance with the invention is illustrated in FIG. 4. Thus a guiding device 122, which is cross sectionally U-shaped, accommodates a carriage, such as in particular the column 124 or center sleeve, that has rectangular cross sectional geometry. The guiding device 122 has a transverse shank 126 and lateral shanks 128, 130, which run vertically relative to it, whereby air bearings 138, 140, 142 originate at the inner surfaces 132, 134, 136 of these lateral shanks. In order to produce the required force counter to the repulsive force that is produced by admitting air into the air bearings 138, 140, 142, i.e. in order to be able to guide the column 124 in a sliding manner, magnet arrangements 144, 146 originate at the inner surface 132 of the transverse shank 126 on the two sides of the air bearing 138. The attractive counteracting force that is necessary is produced by these. As a result of the construction in this way, the column 124 has a free outer surface 148, which runs parallel to the transverse shank 126, at which one or more measurement sensors and/or one or more components of the coordinate-based measurement apparatus or similar device originate or are attached.

The column 124 is moved along the Z-axis via a propulsion unit. In order to do this, a cable can originate at the head of the column 124, whereby this cable is turned around in order to be capable of connection to a servomotor or step motor, as a result of which apparent shortening or lengthening of the cable takes place and this results in the column 124 being movable along the Z-axis. Other propulsion possibilities are also conceivable.

What is claimed is:

1. Bearing (32) for a measurement apparatus, especially a coordinate-based measurement apparatus (100), comprising:

an element (36, 114) running axially relative to and along a mounting device (32, 122) or a guiding device, the element being vertical or at an angle a to the vertical in the range of a being ±45°, wherein the element may be a carriage or column or center sleeve having at least one measurement sensor (116), and is capable of being supported relative to the mounting device by at least one air bearing (38, 40) having a force transferred to the element, and is capable of being compensated by a counteracting force, characterized in that the counteracting force is capable of being produced by a magnet system (42, 44) that is allocated to the mounting device (34).

2. Bearing (32) for a coordinate-based measurement apparatus (100), comprising:

a column (114) or center sleeve movable along a Z-axis thereof and being slidably supported relative to a guiding device (31, 122) by at least one air bearing (38, 40), characterized in that the force produced by the air bearing (38, 40), is capable of being compensated by a counteracting force that is produced by a magnet system (42, 44) that is allocated to the guiding device (34).

3. Bearing in accordance with claim 1 or 2, characterized in that the movable element (36) or column (114) has an area that is not covered by the mounting device or guiding device (34, 122) over its movement pathway, wherein the measurement sensor and/or at least one additional measurement sensor and/or one or more components of the measurement apparatus or coordinate-based measurement apparatus (100) originate at this non-covered area.

4. Bearing in accordance with claim 1 or 2, characterized in that the movable element (36, 114), such as the column (114), has at least three outer surfaces, which extend along the movement pathway, of which one outer surface is an attachment surface for a measurement sensor or the component(s) of the measurement apparatus or the coordinate-based measurement apparatus (100), whereby there is at least one such measurement sensor.

5. Bearing in accordance with claim 1 or 2, characterized in that a permanent magnet originates at the movable element (36) or the column (114), whereby a paramagnetic or ferromagnetic material originating at the mounting device (34) or the guiding device (122), is allocated to this permanent magnet.

6. Bearing in accordance with claim 1 or 2, characterized in that a permanent magnet originating at the mounting device (34) or the guiding device (122), whereby a counteracting element (44), which originates at the movable element (36) such as the column (114) and which comprises a paramagnetic or ferromagnetic material, is allocated to this permanent magnet.

7. Bearing in accordance with claim 1 or 2, characterized in that the element (36) or column (114), which is axially movable relative to the mounting device (34) or the guiding device (122), has a permanent magnet (42), which runs along the direction of movement thereof, with a planar outer surface along which the counteracting element (44) extends that originates at the mounting device or the guiding device and that has the shape of a batten or parallelepiped and that comprises a paramagnetic or ferromagnetic material with an outer surface (58) that runs parallel to that of the permanent magnet.

8. Bearing in accordance with claim 1 or 2, characterized in that the element (36) or column (114), which is axially movable relative to the mounting device (34) or the guiding device (122), has an area, which runs along the direction of movement thereof, or a batten as the counteracting element (44) that comprises the paramagnetic or ferromagnetic material with a planar outer surface, along which the permanent magnet (42) extends that originates at the mounting device or the guiding device and that has the shape of a batten or parallelepiped and that has an outer surface (58) that runs parallel to the counter element.

9. Bearing in accordance with claim 1 or 2, characterized in that the axially movable element (36) or column (114) has a square or rectangular cross sectional shape, and that at least one air bearing (38, 40) is arranged between each of the two mutually adjacent first outer surfaces (46, 48) of the element or column and the area, which faces toward it, of the mounting device (34) or guiding device (122), and that the magnet (42, 44) runs between the air bearings in the region of the point of intersection of the outer surfaces.

10. Bearing in accordance with claim 1 or 2, characterized in that the magnet and counteracting element (42, 44) are arranged along the edge (54) that runs between the first outer surfaces (46, 48) of the element (36) or column (114).

11. Bearing in accordance with claim 1 or 2, characterized in that the edge (54) is beveled and exhibits the strip-shaped or parallelepiped shaped permanent magnet (42).

12. Bearing in accordance with claim 1 or 2, characterized in that a batten (44) comprises steel and which originates at the holding device (34) or guiding device (122), and is allocated to the permanent magnet (42).

13. Bearing in accordance with claim 1 or 2, characterized in that a batten (44) comprises steel and which originates at the element (36) or the column (114), and is allocated to the permanent magnet (42).

14. Bearing in accordance with claim 1 or 2, characterized in that the mounting device or guiding device (122) has a U-shaped cross section with a transverse shank (126) and lateral shanks (128, 130), and that at least one air bearing (138, 140, 142) originates at least on an inner surface (122, 134, 136) of the shanks, and that the element or column (124) is movable along the mounting device or guiding device and includes a rectangular cross section, whereby three outer surfaces run along the inner surfaces of the shanks, and the remaining outer surface (148), which runs parallel to the transverse shank (126) of the mounting device or guiding device, is an attachment for at least one measurement sensor (118, 120) and/or one or more components of the measurement apparatus or coordinate-based measurement apparatus (100).

15. Bearing in accordance with claim 1 or 2, characterized in that at least one magnet (144, 146) for producing the counteracting force is allocated to the transverse shank (126) of the mounting device or guiding device (122).

16. Bearing in accordance with claim 1 or 2, characterized in that a magnet (144, 146) extends on each of the two sides of the air-bearing (138) that originates at the transverse shank (126).

* * * * *